US012279201B2

(12) United States Patent
Otto et al.

(10) Patent No.: US 12,279,201 B2
(45) Date of Patent: *Apr. 15, 2025

(54) FEDERATED PROVISIONING ON MULTIPLE CORE NETWORKS BASED ON UNIQUE DEVICE IDENTIFIERS

(71) Applicant: Cisco Technology, Inc., San Jose, CA (US)

(72) Inventors: Stephan Otto, Palo Alto, CA (US); Abhishek Mukherjee, Suwanee, GA (US); Priyabrat Lahiri, Mountain House, CA (US); Minde Sun, San Jose, CA (US); Blair Martin, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/364,346

(22) Filed: Aug. 2, 2023

(65) Prior Publication Data

US 2023/0379813 A1 Nov. 23, 2023

Related U.S. Application Data

(63) Continuation of application No. 17/521,398, filed on Nov. 8, 2021, now Pat. No. 11,765,651.

(51) Int. Cl.
| | |
|---|---|
| *H04W 48/18* | (2009.01) |
| *H04W 4/50* | (2018.01) |
| *H04W 8/18* | (2009.01) |
| *H04W 60/00* | (2009.01) |

(52) U.S. Cl.
CPC ........... *H04W 48/18* (2013.01); *H04W 4/50* (2018.02); *H04W 8/18* (2013.01); *H04W 60/00* (2013.01)

(58) Field of Classification Search
CPC ......... H04W 48/18; H04W 4/50; H04W 8/18; H04W 60/00
USPC ...................................................... 455/414.1
See application file for complete search history.

(56) References Cited

U.S. PATENT DOCUMENTS

| | | |
|---|---|---|
| 2012/0263298 A1 | 10/2012 | Suh et al. |
| 2012/0295618 A1 | 11/2012 | Ahmavaara et al. |
| 2013/0315155 A1 | 11/2013 | Foti et al. |
| 2014/0141763 A1 | 5/2014 | Suh et al. |
| 2015/0105075 A1 | 4/2015 | Yu et al. |
| 2016/0050697 A1 | 2/2016 | Ahmavaara |
| 2016/0072894 A1 | 3/2016 | Mishra et al. |
| 2017/0332312 A1 | 11/2017 | Jung et al. |
| 2019/0104458 A1 | 4/2019 | Svennebring et al. |

(Continued)

FOREIGN PATENT DOCUMENTS

WO 2017075757 A1 5/2017

*Primary Examiner* — Mark G. Pannell
(74) *Attorney, Agent, or Firm* — Polsinelli P.C.

(57) ABSTRACT

A system and method for provisioning devices on respective LTE or 5G network cores using a hierarchical provisioning connector. Maintained by a connectivity management platform, a hierarchical provisioning connector serving as an extension of a single provisioning connector of the customer account, such that the hierarchical provisioning connector may contain an array of single provisioning connectors. A rule processor that is utilized by the hierarchical provisioning connector to classify devices by access technology. Each configured rule may take one or more unique device identifiers as input and return a reference to exactly one configured single provisioning connector.

20 Claims, 8 Drawing Sheets

(56) References Cited

U.S. PATENT DOCUMENTS

| | | |
|---|---|---|
| 2019/0182645 A1 | 6/2019 | Joseph et al. |
| 2019/0268310 A1 | 8/2019 | Guberman et al. |
| 2020/0359218 A1 | 11/2020 | Lee et al. |
| 2021/0195014 A1 | 6/2021 | Mori et al. |
| 2021/0307089 A1 | 9/2021 | Kim et al. |
| 2022/0322067 A1 | 10/2022 | Kim et al. |

FEDERATED PROVISIONING ON MULTIPLE CORE NETWORKS BASED ON UNIQUE DEVICE IDENTIFIERS

CROSS-REFERENCE TO RELATED APPLICATION

This application is a continuation of, and claims priority to U.S. patent application Ser. No. 17/521,398, filed on Nov. 8, 2021, the full disclosure of which is hereby expressly incorporated by reference in its entirety.

TECHNICAL FIELD

The present disclosure relates generally to provisioning devices onto core networks, and more specifically to federated provisioning based on unique device identifiers at a hierarchical provisioning connector.

BACKGROUND

Fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces.

Connectivity management platforms currently allow the management of devices in different core networks based on the configuration of an account. Devices in a 5G account are provisioned on the 5G core network through a 5G provisioning connector, while devices in an LTE account are provisioned on the LTE core network through an LTE provisioning connector.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form to avoid obscuring the concepts of the subject matter of this disclosure.

Overview

Disclosed are systems, apparatuses, methods, non-transitory computer-readable media, and circuits for provisioning devices on respective LTE or 5G network cores using a hierarchical provisioning connector. According to at least one example, a method may include receiving, by a hierarchical provisioning connector, a provisioning request from a provisioning service for a device. The method may also include invoking, by the hierarchical provisioning connector, a rule processor to determine whether to provision the device to a 5G core network or a LTE core network based on an unique device identifier associated with the device. The method may further include receiving, from the rule processor, a core network identifier associated with the 5G core network or the LTE core network. The method may also include forwarding the provisioning request to a single provisioning connector associated with the core network identifier. In addition, the method may include forwarding a response from the single provisioning connector to the provisioning service.

In some examples, the method may include querying for device identifiers, account identifiers, or operator identifiers of the device in a device database. The method may also include composing retrieved identifiers into a device information object. The method may also include passing the device information object to the rule processor. In some examples, the rule processor may be part of the hierarchical provisioning connector. In other examples, the rule processor may be a part of a device classification service external to the hierarchical provisioning connector. The hierarchical provisioning connector may implement the same provisioning interface as the single provisioning connector.

In some examples, the method may include converting the core network identifier into a core network code based on a lookup in a provisioning database, wherein the core network identifier is numeric and the core network code is alphanumeric. The core network code may be used in a component configuration of the hierarchical provisioning connector and may match one single provisioning connector. The rule processor may assign a priority for each rule, where default rules associated with the LTE core network that match any input have the lowest priority, and specific rules associated with the 5G core network have the highest priority, wherein the specific rules include one or more custom rules for matching individual International Mobile Subscriber Identities (IMSIs) or IMSI ranges for the 5G core network.

In some examples, the method may include receiving a template provisioning request from the provisioning service. The method may further include iterating over a union of all configured core network codes. The method may include invoking each single provisioning connector and storing responses in a map which is indexed by response type. In addition, the method may include returning a most severe provisioning failure to the provisioning service.

A system can include one or more processors and at least one computer-readable storage medium storing instructions which, when executed by the one or more processors, cause the one or more processors to receive, by a hierarchical provisioning connector, a provision request from a provisioning service for a device. The instructions may further cause the one or more processors to invoke, by the hierarchical provisioning connector, a rule processor to determine whether to provision the device to a 5G core network or a LTE core network based on an unique device identifier associated with the device. The instructions may further cause the one or more processors to receive, from the rule processor, a core network identifier associated with the 5G core network or the LTE core network. The instructions may further cause the one or more processors to forward the provision request to a single provisioning connector associated with the core network identifier. In addition, the instructions may further cause the one or more processors to forward a response from the single provisioning connector to the provisioning service.

A non-transitory computer-readable storage medium having stored therein instructions which, when executed by a computing system, cause the computing system to receive, by a hierarchical provisioning connector, a provision request from a provisioning service for a device. The instructions may further cause the computing system to invoke, by the hierarchical provisioning connector, a rule processor to determine whether to provision the device to a 5G core network or a LTE core network based on an unique device identifier associated with the device. The instructions may further cause the computing system to receive, from the rule processor, a core network identifier associated with the 5G core network or the LTE core network. The instructions may further cause the computing system to forward the provision request to a single provisioning connector associated with the core network identifier. In addition, the instructions may further cause the computing system to forward a response from the single provisioning connector to the provisioning service.

Description of Example Embodiments

As noted above, fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces.

Connectivity management platforms currently allow the management of devices in different core networks based on the configuration of an account. Devices in a 5G account are provisioned on the 5G core network through a 5G provisioning connector, while devices in an LTE account are provisioned on the LTE core network through an LTE provisioning connector. The typical scope of an account is one single enterprise. Requiring an enterprise with an existing LTE account to create a new 5G account for the management of 5G devices will lead to a poor customer experience. Likewise, it is inconvenient for an administrator of both 5G and LTE devices to use two different interfaces to provision devices onto the respective core networks.

Therefore, it is desirable to allow the configuration of the provisioning connector at the device level. However, without the improvement provided by the disclosed technology to the connectivity management platform, extensions to the device provisioning service may require that: (1) the user interface accept additional information to label a device as a 5G or LTE device and (2) the device provisioning logic use the additional device information to select the corresponding provisioning connector. Such changes add complexity to the connectivity management platform, and add extra work to a device administrator, which is undesired. There is a need in the art for customer management of 5G and LTE devices in the same account without the need of additional device information to be entered by the customer and maintained in the connectivity management platform.

The disclosed technology addresses the need in the art for customer management of 5G and LTE devices in a same customer account without a need of additional device information to be entered by a customer. Maintained by a connectivity management platform, a hierarchical provisioning connector may serve as an extension of a single provisioning connector of the customer account, such that the hierarchical provisioning connector may contain an array of single provisioning connectors. Each single provisioning connector may completely contain the specific procedures needed to provision devices on one single core network. Additionally, the disclosed technology addresses the need in the art for a rule processor that is utilized by the hierarchical provisioning connector to classify devices by access technology. Each configured rule may take one or more unique device identifiers as input and return a reference to exactly one configured single provisioning connector.

The rule processor can be integrated using: (1) an inline rule processor, where each hierarchical provisioning connector may contain its own private rule processor, or (2) an external device classification service, where multiple hierarchical provisioning connectors within the connectivity management platform may delegate the rule processing to an external service. The use of an external device classification service may allow for a complete separation of device connectivity management and access technology awareness.

The present technology involves system, methods, and computer-readable media for provisioning devices on respective LTE or 5G network cores using a hierarchical provisioning connector. First, a provisioning request may be initiated by the device management platform. The hierarchical provisioning connector may then invoke the rule processor in one of the two integration models outlined in [0020]. The rule processor may process all configured rules using one or more unique device identifiers associated with the provisioned device until a matching rule is found. Upon completion, the rule processor may return the provisioning connector reference of the matched rule to the hierarchical provisioning connector. The hierarchical provisioning connector may then forward the provisioning request to the referenced single provisioning connector. Once a response is received from the single provisioning connector, the hierarchical provisioning connector may forward the response to the connectivity management platform.

The hierarchical provisioning connector offers an ability to federate devices provisioned on different core networks in the same enterprise account, and devices using different access technologies or service providers in the same enterprise account. In addition, the hierarchical provisioning connector may be implemented in a manner that requires no change to the user interface, user experience or device onboarding flow, change to the device provisioning service and core provisioning logic, or additional per-device information maintained in the platform. In addition, all unique device identifiers known to the IoT connectivity management platform may be used and existing accounts may be easily converted by assigning a new provisioning connector. Furthermore, rules may be tailored to specific service providers or utilize common device criteria and may be made consistent with the routing of signals in the access network.

Figure 1A:
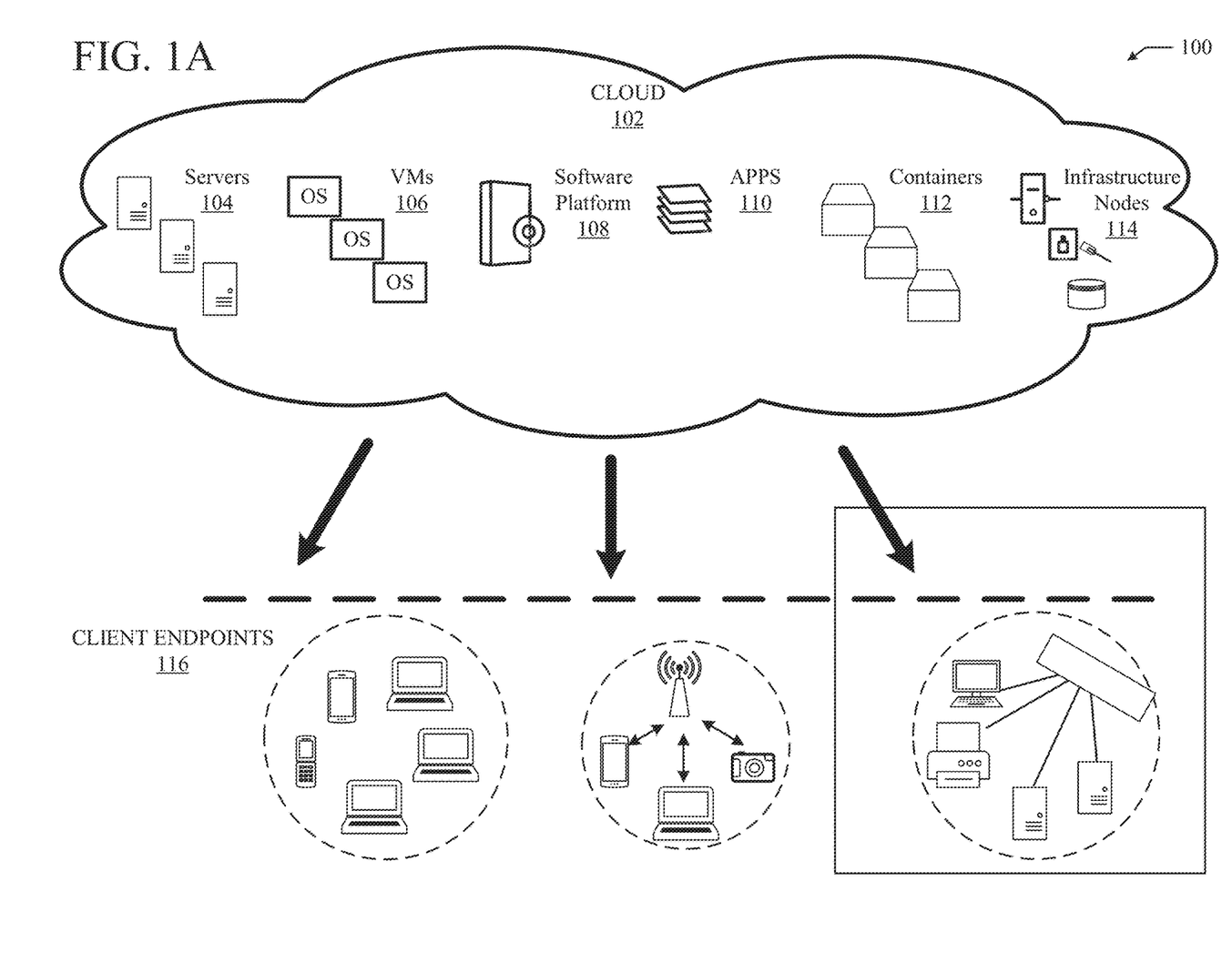
FIG. 1A illustrates an example cloud computing architecture.
Figure 1B:
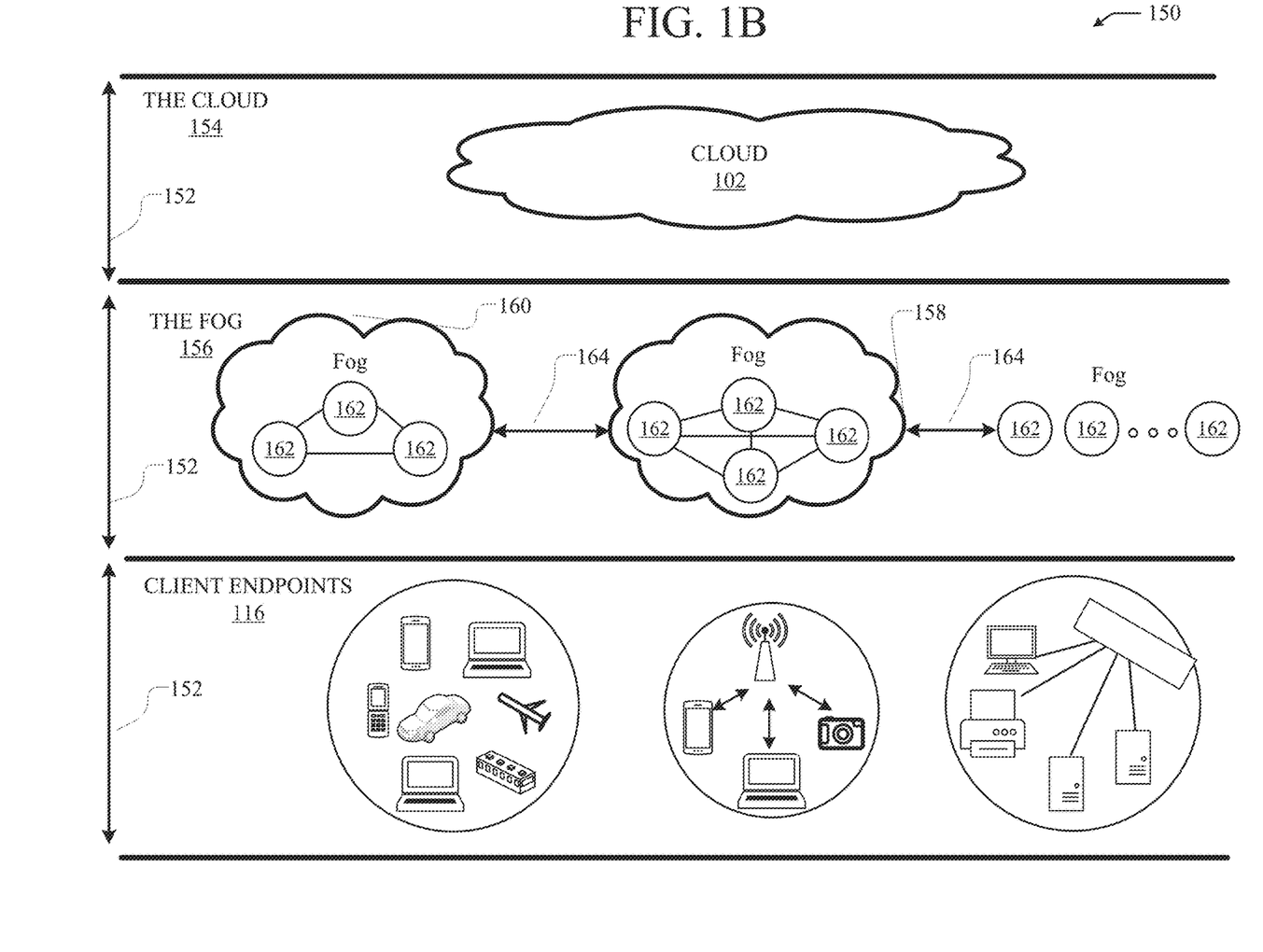
FIG. 1B illustrates an example fog computing architecture.
Figure 2:
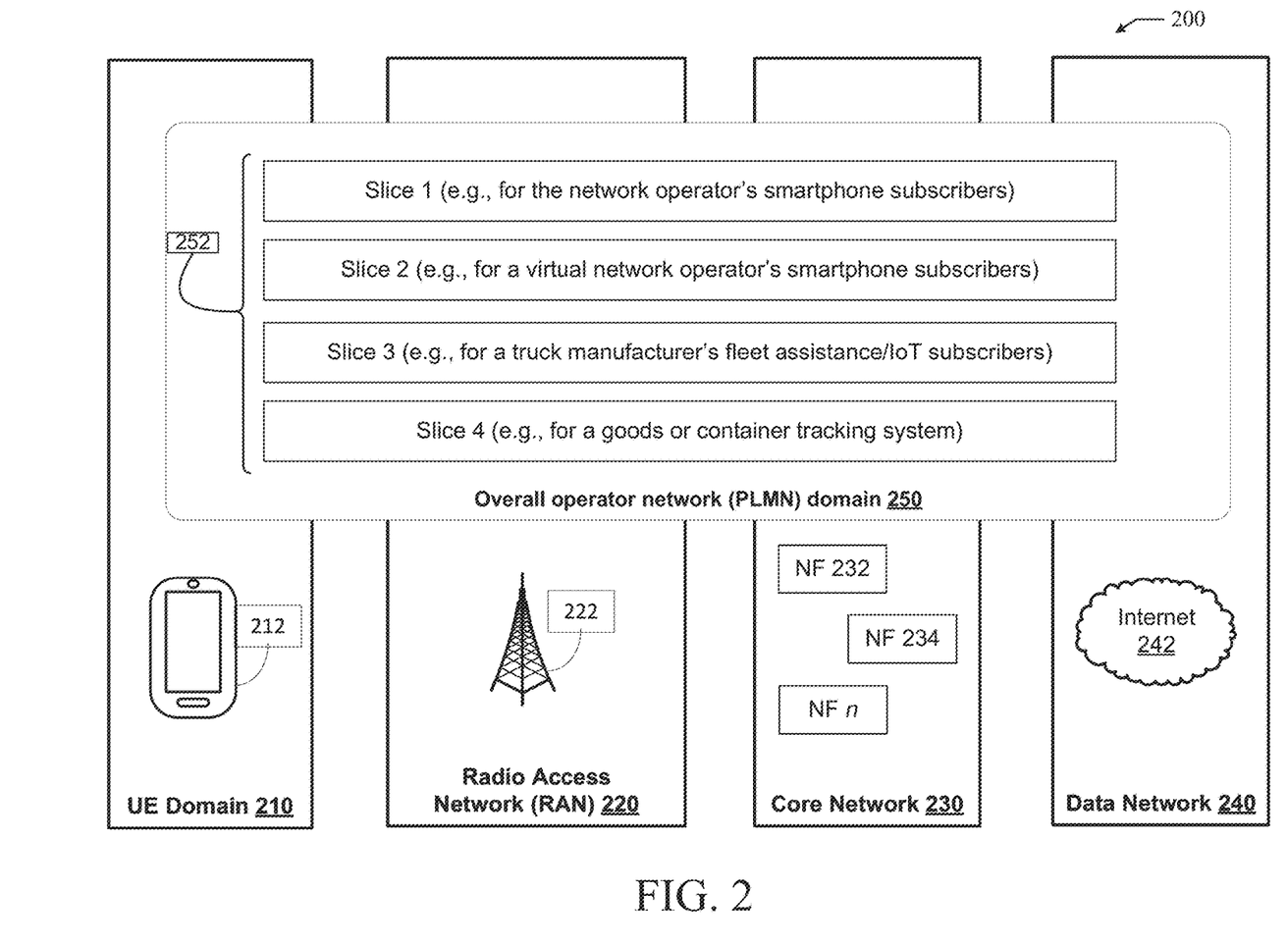
FIG. 2 depicts an example schematic representation of a 5G network environment in which network slicing has been implemented, and in which one or more aspects of the present disclosure may operate.
Figure 3A:
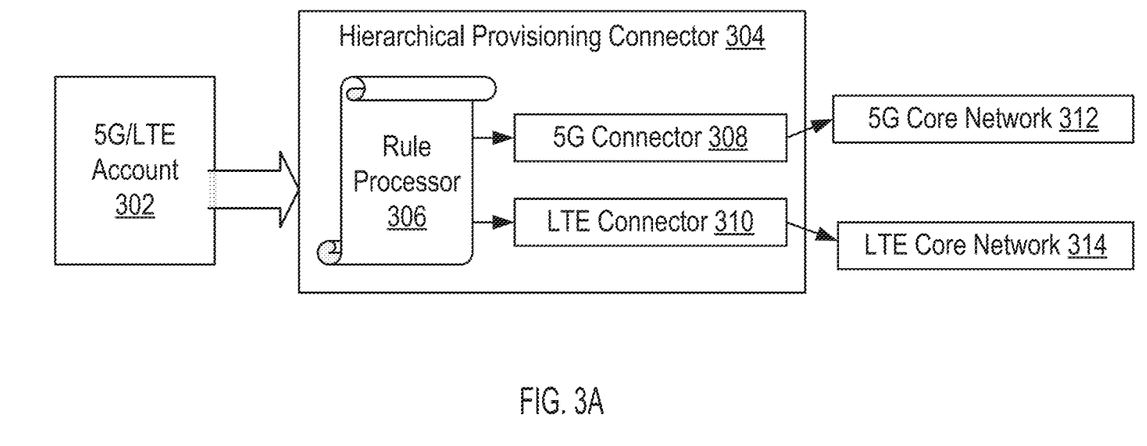
FIG. 3A illustrates an example schematic representation of a hierarchical provisioning connector with an internal rule processor, according to an example of the instant disclosure.
Figure 3B:
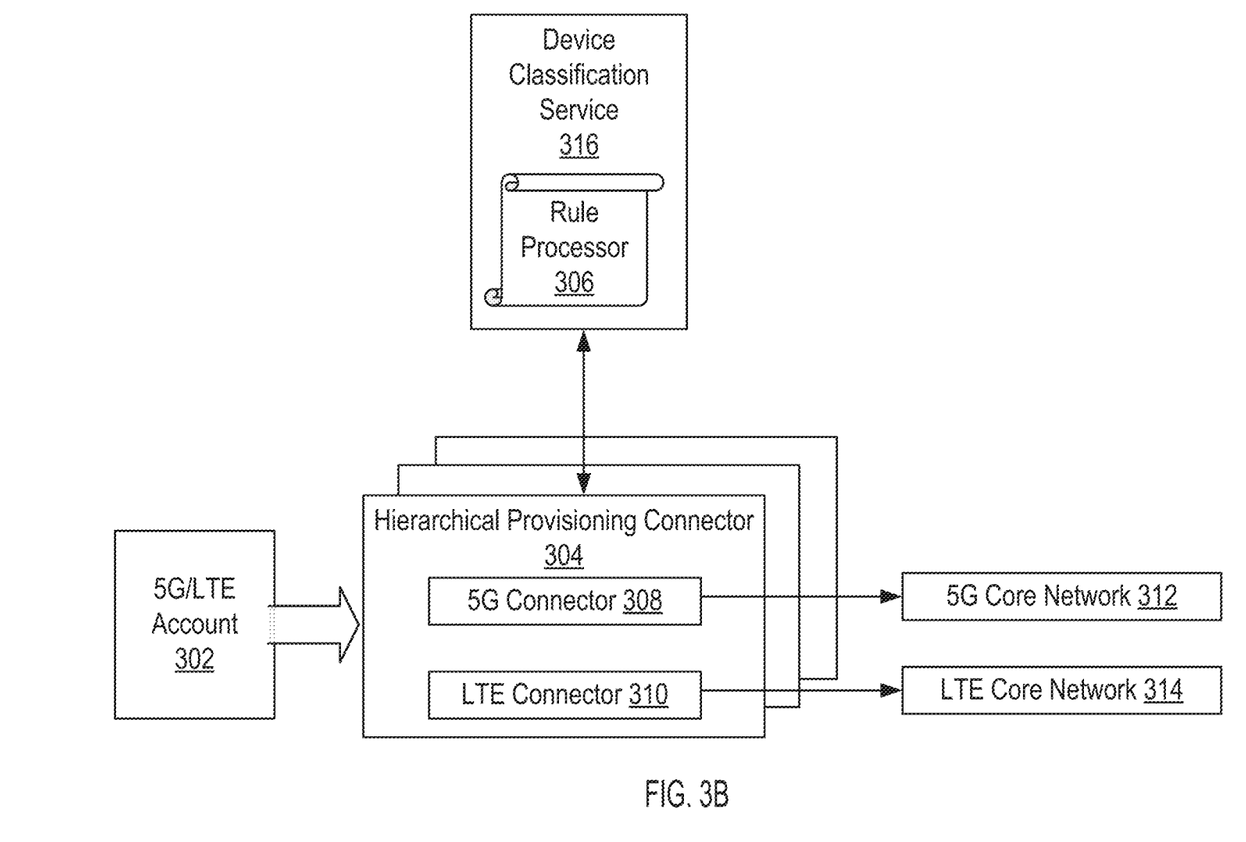
FIG. 3B illustrates an example schematic representation of a hierarchical provisioning connector with an external rule processor stored in association with a device classification service, according to an example of the instant disclosure.
Figure 4:
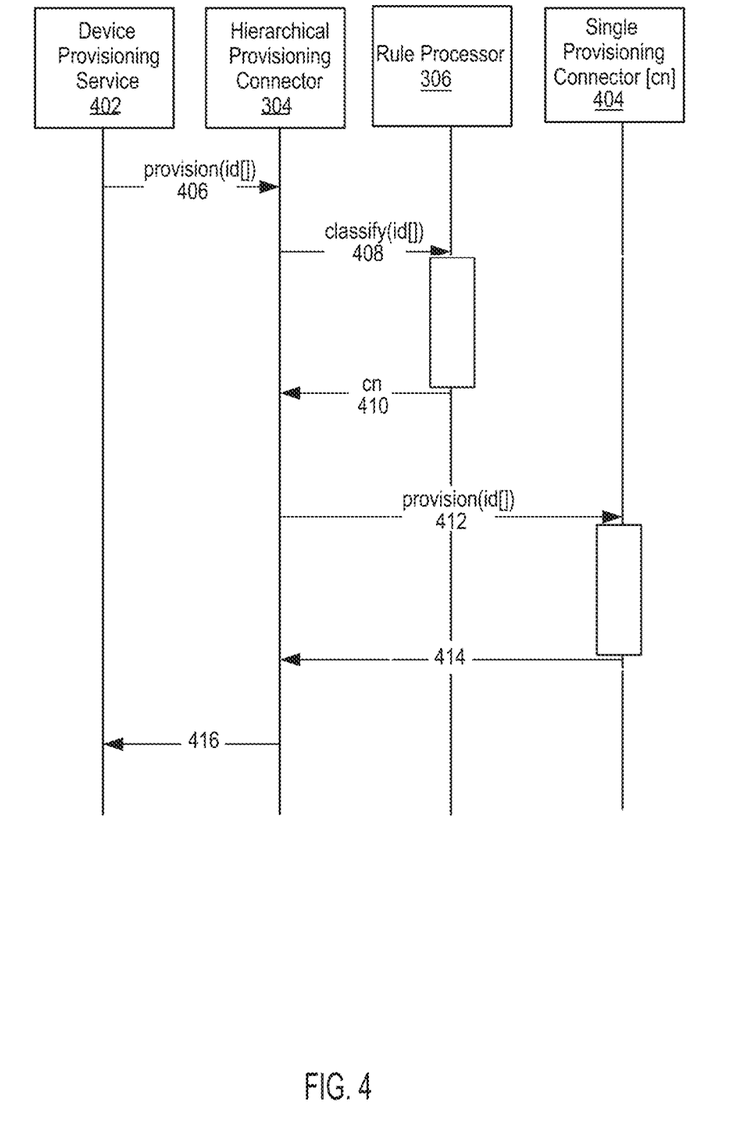
FIG. 4 illustrates an example flow diagram of periodic provisioning requests made to a hierarchical provisioning connector by a device provisioning service in accordance with some aspects of the present disclosure.
Figure 5:
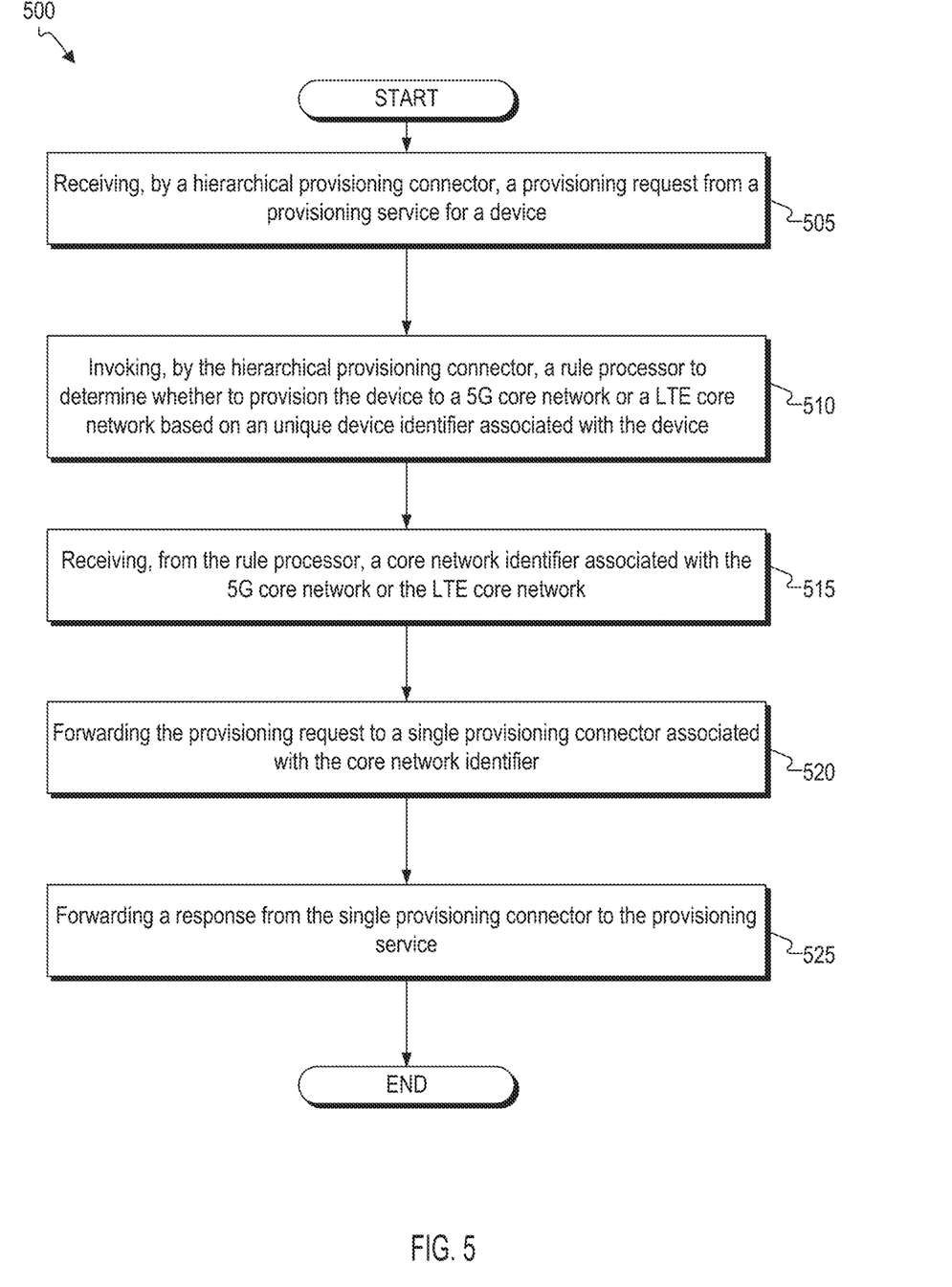
FIG. 5 illustrates an example method for providing a hierarchical provisioning connector according to an example of the instant disclosure.
Figure 6:
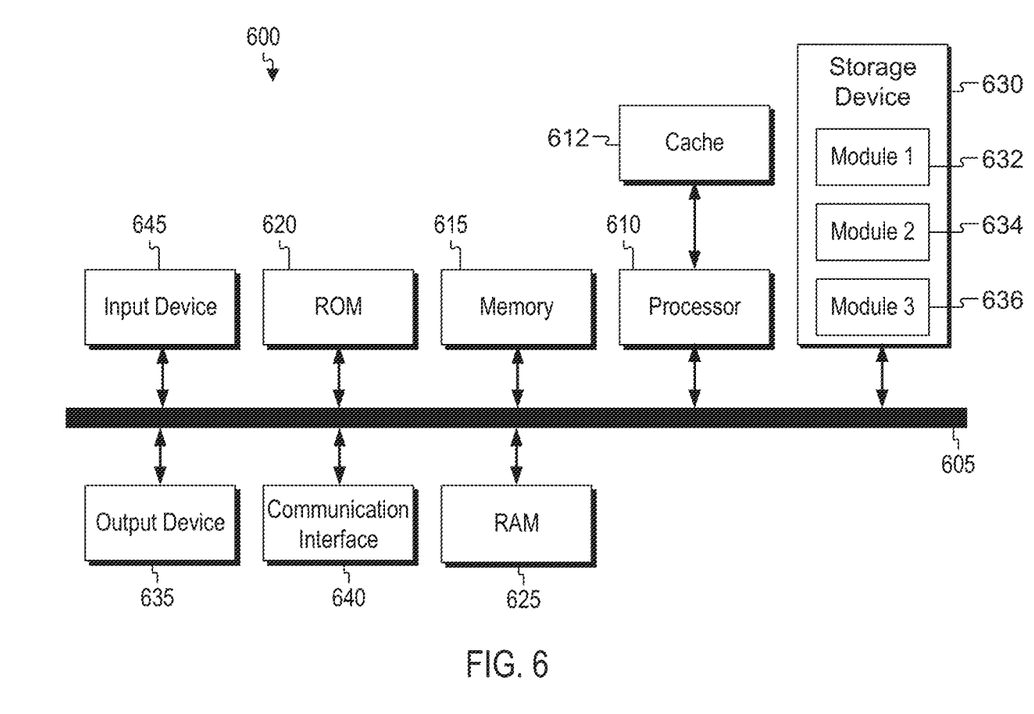
FIG. 6 shows an example of a computing system in accordance with some aspects of the present disclosure.

A description of network environments and architectures for network data access and services, as illustrated in FIGS. 1A, 1B, and 2 is first disclosed herein. A discussion of systems, methods, and computer-readable media for provisioning devices on respective LTE or 5G network cores using a hierarchical provisioning connector, as shown in FIGS. 3-5, will then follow. The discussion then concludes with a brief description of an example device, as illustrated in FIG. 6. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an example schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

FIG. 3A illustrates an example schematic representation of a hierarchical provisioning connector with an internal rule processor, according to an example of the instant disclosure. A connectivity management platform, such as the Cisco Internet of Things (IoT) Control Center®, may allow the management of devices in different core networks based on an account configuration. Devices in a 5G account are provisioned on the 5G core network through a 5G provisioning connector, while devices in an LTE account are provisioned on the LTE core network through an LTE provisioning connector. The typical scope of an account is one single enterprise and therefore, an enterprise with an existing LTE account would be required to create a new 5G account for the management of 5G device, which is undesirable.

Instead, as shown in FIG. 3A, a customer account 302 may send a provisioning request to a hierarchical provisioning connector 304 of a device management platform. When the provisioning request is initiated by the device management platform, the hierarchical provisioning connector 304 may invoke a rule processor 306 in one of two integration models. As shown in FIG. 3A, the hierarchical provisioning connector 304 may include the rule processor 306 as an internal rule processor. The rule processor 306 may process all configured rules using one or more unique device identifiers associated with the provisioned device until a matching rule is found. How the rule processor 306 processes will be discussed in further detail below, with respect to FIG. 3B. Upon completion, the rule processor 306 may return a single provisioning connector reference, a 5G connector 308 or a LTE connector 310, of a matched rule to the hierarchical provisioning connector 304. The hierarchical provisioning connector 304 may then forward the provisioning request to the referenced single provisioning connector. Once a response is received from the single provisioning connector, the hierarchical provisioning connector 304 forwards it to a connectivity management platform to connect the 5G/LTE account 302 to a corresponding core network, a 5G core network 312, or an LTE core network 314.

FIG. 3B illustrates an example schematic representation of a hierarchical provisioning connector with an external rule processor stored in association with a device classification service, according to an example of the instant disclosure. Similar to the process shown in FIG. 3A, the 5G or LTE customer account 302 may send a provisioning request to the hierarchical provisioning connector 304. When the provisioning request is initiated by the device management platform, the hierarchical provisioning connector 304 may invoke the rule processor 306, which may be an external rule processor of an external device classification service 316, as shown in FIG. 3B. The external device classification service 316 may service multiple hierarchical provisioning connectors within the connectivity management platform. The use of an external device classification service allows for a complete separation of device connectivity management and access technology awareness.

The device classification may be transparent to the user, with no additional UI or UI elements being used during provisioning in comparison to the device connectivity management platform using only the single provisioning connector. Additional configuration directed at the rule processor may be entered by the (service provider or system) administrator. The rules may be programmed directly into the device database, with or without a UI for the configuration thereof. Device information may include all available identifiers that would have been uploaded to the device connectivity management platform from text files without the single provisioning connector.

Similar to the process shown in FIG. 3A, upon completion, the rule processor 306 may return a single provisioning connector reference, the 5G connector 308 or the LTE connector 310, of a matched rule to the hierarchical provisioning connector 304. The hierarchical provisioning connector 304 may then forward the provisioning request to the referenced single provisioning connector. Once a response is received from the single provisioning connector, the hierarchical provisioning connector 304 forwards it to the connectivity management platform to connect the 5G/LTE account 302 to a corresponding core network, the 5G core network 312, or the LTE core network 314.

FIG. 4 illustrates an example flow diagram of periodic provisioning requests made to a hierarchical provisioning connector by a device provisioning service in accordance with some aspects of the present disclosure. A device provisioning service 402 may initiate 406 a provisioning request based on identifiers associated with a device that for which provisioning is requested. Suitable device identifiers include International Mobile Subscriber Identity (IMSI), Mobile Station International Subscriber Directory Number (MSISDN) or Integrated Circuit Card Identification Number (ICCID).

After receiving the provisioning request from the device provisioning service 402, the hierarchical provisioning connector 304 may look up all relevant device, account, and operator identifiers for the device (i.e. identifiers that can be used in classification rules) in a device database. The hierarchical provisioning connector 304 may compose the retrieved identifiers into a device information object and pass (408) the device information object to the rule processor 306. The bracketed syntax of the function call classify (id[]) symbolize an array of identifiers that can be used in classification rules. The rule processor 306 may support standard and custom rules.

Suitable device identifiers include IMSI, MSISDN or ICCID. The example below implements rules using IMSI, supporting standard and custom rules.

Standard rules can match a single ID or range of ID's:

matches(*imsi*, *cn*) := *imsi* = *imsi*(*cn*)

matches(*imsi*, *cn*) := *imsi*1(*cn*) ≤ *imsi* ≤ *imsi*2(*cn*)

Custom rules can match any part or parts of an ID, e.g. matches(*imsi*, *cn*) := substring(*imsi*, 1.5) = *a*(*cn*) ∧ *b*(*cn*) ≤ substring(*imsi*, 6, 3) ≤ *c*(*cn*)

A special standard rule may be the default rule that matches any input. Each rule may have a priority assigned and rules may be processed in order of decreasing priority. Single ID rules may have the highest priority and default rules may have the lowest priority. The LTE network is usually configured with a default rule so that requests for all existing devices are routed to the LTE provisioning connector. Then, rules for the 5G network can be added for individual IMSI's or IMSI ranges so that only requests for those IMSI's or IMSI ranges go to the 5G provisioning connector.

After finding a matching rule with a highest priority, the rule processor 306 may return (410) a core network identifier (cn) of that rule. If multiple matching rules with the same priority are found, the rule processor 306 may return an error and the provisioning request may be aborted. The hierarchical provisioning connector 304 may first convert the core network identifier into a core network code. The core network identifier may be numeric while the core network code may be an alphanumeric label. The conversion may be based on a lookup in the provisioning database, but the results may be cached for configured provisioning connectors. The core network code may be used in the component configuration of the hierarchical provisioning connector 304 where it matches exactly one configured single provisioning connector 404. If the core network identifier does not resolve to a core network code or the code network code does not resolve to a single provisioning connector, the provisioning request may be aborted.

The hierarchical provisioning connector 304 may implement the same provisioning interface as the single provisioning connector 404, such that the hierarchical provisioning connector 304 can be inserted into a provisioning flow without any changes to the provisioning service. Once the hierarchical provisioning connector 304 has selected one single provisioning connector 404, the hierarchical provisioning connector 304 sends (412) the original provisioning request to this single provisioning connector 404. The bracketed syntax of the function call provision(id[ ]) symbolize an array of identifiers that are to be provisioned. The single provisioning connector 404 is not aware of the hierarchical provisioning connector 304 and processes the provisioning request in the same way as if it was used exclusively by the account. The single provisioning connector 404 returns (414) the response to the calling object which is the hierarchical provisioning connector 304, and the hierarchical provisioning connector 304 returns (416) the response to the calling object which is the device provisioning service 402. Thus, the hierarchical provisioning connector 304 acts as an intelligent proxy for the single provisioning connector 404.

When the hierarchical provisioning connector 304 is used for template provisioning, it may operate in a different mode. Contrary to devices which are provisioned on one specific core network, templates may be common to all core networks managed by the hierarchical provisioning connector 304. At the time of device provisioning on one specific core network, the template is used by the core network to provision services according to the settings in the device management platform.

While the content of the templates is common across all managed core networks, the representation of the templates is specific to each core network. Each single provisioning connector completely contains the specific procedures needed to provision templates on one single core network. When a template provisioning request is received by the hierarchical provisioning connector, the hierarchical provisioning connector 304 may take the union of all configured core network codes and iterate over it. The hierarchical provisioning connector 304 may invoke each single provisioning connector in turn, storing the responses in a map which is indexed by response type.

If one single provisioning connector call fails, the hierarchical provisioning connector 304 may continue with the next single provisioning connector. After the iteration has finished, the hierarchical provisioning connector 304 may rank the stored response types by severity and return the most severe response type to the provisioning service. That is, if one or more single provisioning connectors returned a fatal error, then the hierarchical provisioning connector 304 may return a fatal error, while if and only if all single provisioning connectors returned success, the hierarchical provisioning connector 304 may return success. This behavior causes the provisioning service to retry the provisioning request in the manner needed to correct the most severe provisioning failure (if recoverable) while the retries of the successful provisioning requests or the less severe provisioning failures are required to be idempotent.

An additional benefit of the use of classification rules is that these rules can be made consistent with the routing of signals in the access network. If, for instance, an NG-RAN is connected to both a 5G and an LTE core network, the rules can be used by the connectivity management platform to provision devices on the appropriate core network and also by the NG-RAN to establish device connectivity through the same core network.

FIG. 5 illustrates an example method for providing a hierarchical provisioning connector according to an example of the instant disclosure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method includes receiving, by a hierarchical provisioning connector, a provisioning request from a provisioning service for a device at step 505. For example, the hierarchical provisioning connector 304 illustrated in FIGS. 3A-3B may receive a provision request from a provisioning service for a device.

According to some examples, the method includes invoking, by the hierarchical provisioning connector, a rule processor to determine whether to provision the device to a 5G core network or a LTE core network based on an unique device identifier associated with the device at step 510. For example, the hierarchical provisioning connector 304 illustrated in FIGS. 3A-3B may invoke a rule processor to determine whether to provision the device to a 5G core network or a LTE core network based on an unique device identifier associated with the device.

According to some examples, the method includes receiving, from the rule processor, a core network identifier associated with the 5G core network or the LTE core network at step 515. For example, the hierarchical provisioning connector 304 illustrated in FIGS. 3A-3B may receive, from the rule processor, a core network identifier associated with the 5G core network or the LTE core network.

According to some examples, the method includes forwarding the provisioning request to a single provisioning connector associated with the core network identifier at step 520. For example, the hierarchical provisioning connector 304 illustrated in FIGS. 3A-3B may forward the provision request to a single provisioning connector (e.g., 5G connector 308, LTE connector 310, etc.) associated with the core network identifier.

According to some examples, the method includes forwarding a response from the single provisioning connector to the provisioning service at step 525. For example, the hierarchical provisioning connector 304 illustrated in FIGS. 3A-3B may forward a response from the single provisioning connector to the provisioning service.

According to some examples, the method includes querying for device identifiers, account identifiers, or operator identifiers of the device in a device database. For example, the hierarchical provisioning connector 304 illustrated in FIGS. 3A-3B may query for device identifiers, account identifiers, or operator identifiers of the device in a device database.

According to some examples, the method includes composing retrieved identifiers into a device information object. For example, the hierarchical provisioning connector 304 illustrated in FIGS. 3A-3B may compose retrieved identifiers into a device information object.

According to some examples, the method includes passing the device information object to the rule processor. For example, the hierarchical provisioning connector 304 illustrated in FIGS. 3A-3B may pass the device information object to the rule processor. In some examples, the hierarchical provisioning connector implements the same provisioning interface as the single provisioning connector. In some examples, the rule processor is part of the hierarchical provisioning connector. In some examples, the rule processor is part of a device classification service external to the hierarchical provisioning connector. In some examples, the rule processor assigns a priority for each rule, where default rules associated with the LTE core network that match any input have the lowest priority, and single ID rules associated with the 5G core network have the highest priority. In some examples, the specific rules include one or more custom rules for matching individual International Mobile Subscriber Identities (IMSIs) or IMSI ranges for the 5G core network.

According to some examples, the method includes converting the core network identifier into a core network code based on a lookup in a provisioning database. For example, the hierarchical provisioning connector 304 illustrated in FIGS. 3A-3B may convert the core network identifier into a core network code based on a lookup in a provisioning database. In some examples, the core network identifier is numeric and the core network code is alphanumeric. In some examples, the core network code is used in a component configuration of the hierarchical provisioning connector and matches one single provisioning connector.

According to some examples, the method includes receiving a template provisioning request from the single provisioning connector. For example, the hierarchical provisioning connector 304 illustrated in FIGS. 3A-3B may receive a template provisioning request from the device provisioning service. According to some examples, the method includes iterating over a union of all configured core network codes. For example, the hierarchical provisioning connector 304 illustrated in FIGS. 3A-3B may iterate over a union of all configured core network codes.

According to some examples, the method includes invoking each single provisioning connector, and storing responses in a map which is indexed by response type. For example, the hierarchical provisioning connector 304 illustrated in FIGS. 3A-3B may invoke each single provisioning connector, and store responses in a map which is indexed by response type. According to some examples, the method includes returning the most severe provisioning failure to the provisioning service. For example, the hierarchical provisioning connector 304 illustrated in FIGS. 3A-3B may return the most severe provisioning failure to the provisioning service.

FIG. 6 shows an example of a computing system in accordance with some aspects of the present disclosure. FIG. 6 shows an example of computing system 600, which can be for example any computing device making up the hierarchical provisioning connector 304 or rule processor 306, or any component thereof in which the components of the system are in communication with each other using connection 605. Connection 605 can be a physical connection via a bus, or a direct connection into one or more processors 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to one or more processors 610. Computing system 600 can include a cache of high-speed memory 612 connected directly with, in close proximity to, or integrated as part of process one or more processors 610.

One or more processors 610 can include any general purpose processor and a hardware service or software service, such as services 632, 634, and 636 stored in storage device 630, configured to control processor 610 as well as a special-purpose processor where software instructions are incorporated into the actual processor design. One or more processors 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the one or more processors 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1: A computer-implemented method, comprising: receiving, by a hierarchical provisioning connector, a provisioning request from a provisioning service for a device; invoking, by the hierarchical provisioning connector, a rule processor to determine whether to provision the device to a 5G core network or a LTE core network based on an unique device identifier associated with the device; receiving, from the rule processor, a core network identifier associated with the 5G core network or the LTE core network; forwarding the provisioning request to a single provisioning connector associated with the core network identifier; and forwarding a response from the single provisioning connector to the provisioning service.

Aspect 2: The computer-implemented method of Aspect 1, further comprising: querying for device identifiers, account identifiers, or operator identifiers of the device in a device database; composing retrieved identifiers into a device information object; and passing the device information object to the rule processor.

Aspect 3: The computer-implemented method of any of Aspects 1 to 2, wherein the rule processor is part of the hierarchical provisioning connector.

Aspect 4: The computer-implemented method of any of Aspects 1 to 2, wherein the rule processor is part of a device classification service external to the hierarchical provisioning connector.

Aspect 5: The computer-implemented method of any of Aspects 1 to 4, wherein the hierarchical provisioning connector implements a same provisioning interface as the single provisioning connector.

Aspect 6: The computer-implemented method of any of Aspects 1 to 5, further comprising: converting the core network identifier into a core network code based on a lookup in a provisioning database, wherein the core network identifier is numeric and the core network code is alphanumeric, and wherein the core network code is used in a component configuration of the hierarchical provisioning connector and matches one single provisioning connector.

Aspect 7: The computer-implemented method of any of Aspects 1 to 6, wherein the rule processor assigns a priority for each rule, where default rules associated with the LTE core network that match any input have a lowest priority, and single ID rules associated with the 5G core network have a highest priority, wherein the specific rules include one or more custom rules for matching individual International Mobile Subscriber Identities (IMSIs) or IMSI ranges for the 5G core network.

Aspect 8: The computer-implemented method of any of Aspects 1 to 7, further comprising: receiving a template provisioning request from the single provisioning connector; iterating over a union of all configured core network codes; invoking each single provisioning connector, and storing responses in a map which is indexed by response type; and returning the most severe provisioning failure to the provisioning service.

Aspect 9: A system comprising: a storage configured to store instructions; a processor configured to execute the instructions and cause the one or more processors to: receive, by a hierarchical provisioning connector, a provision request from a provisioning service for a device, invoke, by the hierarchical provisioning connector, a rule processor to determine whether to provision the device to a 5G core network or a LTE core network based on an unique device identifier associated with the device, receive, from the rule processor, a core network identifier associated with the 5G core network or the LTE core network, forward the provision request to a single provisioning connector associated with the core network identifier, and forward a response from the single provisioning connector to the provisioning service.

Aspect 10: The system of Aspect 9, wherein the one or more processors is configured to execute the instructions and cause the one or more processors to: query for device identifiers, account identifiers, or operator identifiers of the device in a device database; compose retrieved identifiers into a device information object; and pass the device information object to the rule processor.

Aspect 11: The system of any of Aspects 9 to 10, wherein the rule processor is part of the hierarchical provisioning connector.

Aspect 12: The system of any of Aspects 9 to 10, wherein the rule processor is part of a device classification service external to the hierarchical provisioning connector.

Aspect 13: The system of any of Aspects 9 to 12, wherein the hierarchical provisioning connector implements a same provisioning interface as the single provisioning connector.

Aspect 14: The system of any of Aspects 9 to 13, wherein the one or more processors is configured to execute the instructions and cause the one or more processors to: convert the core network identifier into a core network code based on a lookup in a provisioning database, wherein the core network identifier is numeric and the core network code is alphanumeric.

Aspect 15: The system of any of Aspects 9 to 14, wherein the rule processor assigns a priority for each rule, where default rules associated with the LTE core network that match any input have the lowest priority, and specific rules associated with the 5G core network have the highest priority.

Aspect 16: The system of any of Aspects 9 to 15, wherein one or more processors is configured to execute the instructions and cause the one or more processors to: receive a template provisioning request from the single provisioning connector; iterate over a union of all configured core network codes; invoke each single provisioning connector, and store responses in a map which is indexed by response type; and return the most severe provisioning failure to the provisioning service.

Aspect 17: A non-transitory computer-readable medium comprising instructions, the instructions, when executed by a computing system, cause the computing system to: receive, by a hierarchical provisioning connector, a provision request from a provisioning service for a device; invoke, by the hierarchical provisioning connector, a rule processor to determine whether to provision the device to a 5G core network or a LTE core network based on an unique device identifier associated with the device; receive, from the rule processor, a core network identifier associated with the 5G core network or the LTE core network; forward the provision request to a single provisioning connector associated with the core network identifier; and forward a response from the single provisioning connector to the provisioning service.

Aspect 18: The non-transitory computer-readable medium of Aspect 17, wherein the non-transitory computer-readable medium further comprises instructions that, when executed by the computing system, cause the computing system to: query for device identifiers, account identifiers, or operator identifiers of the device in a device database; compose retrieved identifiers into a device information object; and pass the device information object to the rule processor.

Aspect 19: The non-transitory computer-readable medium of any of Aspects 17 to 18, the rule processor is part of the hierarchical provisioning connector.

Aspect 20: The non-transitory computer-readable medium of any of Aspects 17 to 18, the rule processor is part of a device classification service external to the hierarchical provisioning connector.

What is claimed is:

1. A computer-implemented method, comprising:
   receiving, by a processor of a hierarchical provisioning connector, a provisioning request from a provisioning service for a device;
   determining whether to provision the device to a 5G core network or an LTE core network based on a unique device identifier associated with the device;
   receiving a core network identifier associated with the 5G core network or the LTE core network;
   forwarding the provisioning request to a single provisioning connector associated with the core network identifier; and
   forwarding a response from the single provisioning connector to the provisioning service.

2. The computer-implemented method of claim 1, further comprising:
   querying for device identifiers, account identifiers, or operator identifiers of the device in a device database;
   composing retrieved identifiers into a device information object; and
   passing the device information object to a rule processor.

3. The computer-implemented method of claim 1, further comprising a rule processor, the rule processor configured to determining whether to provision the device to the 5G core network or the LTE core network.

4. The computer-implemented method of claim 3, wherein the rule processor is part of the hierarchical provisioning connector.

5. The computer-implemented method of claim 3, wherein the rule processor is external to the hierarchical provisioning connector.

6. The computer-implemented method of claim 5, wherein the rule processor services a plurality of hierarchical provisioning connectors.

7. The computer-implemented method of claim 3, wherein the rule processor assigns a priority for each rule, where default rules associated with the LTE core network that match any input have a lowest priority, and device specific rules associated with the 5G core network have a highest priority, wherein the specific rules include one or more custom rules for matching individual International Mobile Subscriber Identities (IMSIs) or IMSI ranges for the 5G core network.

8. The computer-implemented method of claim 1, further comprising:
converting the core network identifier into a core network code based on a lookup in a provisioning database, wherein the core network identifier is numeric and the core network code is alphanumeric, and wherein the core network code is used in a component configuration of the hierarchical provisioning connector and matches one single provisioning connector.

9. The computer-implemented method of claim 1, further comprising:
receiving a template provisioning request from the single provisioning connector;
iterating over a union of all configured core network codes;
invoking each single provisioning connector, and storing responses in a map which is indexed by response type; and
returning a most severe provisioning failure to the provisioning service.

10. A system comprising:
a storage configured to store instructions; and
one or more processors configured to execute the instructions and cause the system to:
receive, at a hierarchical provisioning connector, a provisioning request from a provisioning service for a device;
determine whether to provision the device to a 5G core network or an LTE core network based on a unique device identifier associated with the device;
receive a core network identifier associated with the 5G core network or the LTE core network;
forward the provisioning request to a single provisioning connector associated with the core network identifier; and
forward a response from the single provisioning connector to the provisioning service.

11. The system of claim 10, further comprising instructions which when executed cause the system to:
query for device identifiers, account identifiers, or operator identifiers of the device in a device database;
compose retrieved identifiers into a device information object; and
pass the device information object to a rule processor.

12. The system of claim 10, further comprising a rule processor, the rule processor configured to determining whether to provision the device to the 5G core network or the LTE core network.

13. The system of claim 12, wherein the rule processor is part of the hierarchical provisioning connector.

14. The system of claim 12, wherein the rule processor is external to the hierarchical provisioning connector.

15. The system of claim 14, wherein the rule processor services a plurality of hierarchical provisioning connectors.

16. The system of claim 12, wherein the rule processor assigns a priority for each rule, where default rules associated with the LTE core network that match any input have a lowest priority, and device specific rules associated with the 5G core network have a highest priority, wherein the specific rules include one or more custom rules for matching individual International Mobile Subscriber Identities (IMSIs) or IMSI ranges for the 5G core network.

17. The system of claim 10, further comprising instructions which when executed cause the system to:
convert the core network identifier into a core network code based on a lookup in a provisioning database, wherein the core network identifier is numeric and the core network code is alphanumeric, and wherein the core network code is used in a component configuration of the hierarchical provisioning connector and matches one single provisioning connector.

18. The system of claim 10, further comprising instructions which when executed cause the system to:
receive a template provisioning request from the single provisioning connector;
iterate over a union of all configured core network codes;
invoke each single provisioning connector, and storing responses in a map which is indexed by response type; and
return a most severe provisioning failure to the provisioning service.

19. A non-transitory computer-readable medium comprising instructions, the instructions, when executed by one or more processors, cause the one or more processors to:
receive, at a hierarchical provisioning connector, a provisioning request from a provisioning service for a device;
determine whether to provision the device to a 5G core network or an LTE core network based on a unique device identifier associated with the device;
receive a core network identifier associated with the 5G core network or the LTE core network;
forward the provisioning request to a single provisioning connector associated with the core network identifier; and
forward a response from the single provisioning connector to the provisioning service.

20. The non-transitory computer-readable medium of claim 19, further comprising a rule processor, the rule processor configured to determining whether to provision the device to the 5G core network or the LTE core network.

* * * * *